(12) United States Patent
Yarbrough et al.

(10) Patent No.: US 11,781,528 B2
(45) Date of Patent: Oct. 10, 2023

(54) SYSTEM AND METHOD FOR SERVICING A JOINTED ROTOR BLADE OF A WIND TURBINE

(71) Applicant: General Electric Company, Schenectady, NY (US)

(72) Inventors: Aaron Alpheus Yarbrough, Greenville, SC (US); Scott Jacob Huth, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/630,971

(22) PCT Filed: Jul. 31, 2019

(86) PCT No.: PCT/US2019/044366
§ 371 (c)(1),
(2) Date: Jan. 28, 2022

(87) PCT Pub. No.: WO2021/021160
PCT Pub. Date: Feb. 4, 2021

(65) Prior Publication Data
US 2022/0268262 A1    Aug. 25, 2022

(51) Int. Cl.
*F03D 80/50* (2016.01)
*F03D 13/00* (2016.01)
*B23P 6/04* (2006.01)

(52) U.S. Cl.
CPC .............. *F03D 80/50* (2016.05); *B23P 6/045* (2013.01); *F03D 13/00* (2016.05); *F05B 2230/61* (2013.01)

(58) Field of Classification Search
CPC ............ F05B 2230/61; F05B 2240/302; F03D 13/00; F03D 13/10; F03D 80/50; F03D 1/0658
See application file for complete search history.

(56) References Cited

U.S. PATENT DOCUMENTS

| 8,033,791 | B1 | 10/2011 | Watanabe |
| 8,595,931 | B2 | 12/2013 | Riddell et al. |
| 9,316,202 | B2 | 4/2016 | Bech |
| 9,476,403 | B2 | 10/2016 | Smith et al. |

(Continued)

FOREIGN PATENT DOCUMENTS

| DE | 202004016460 U1 | 12/2004 |
| DE | 102005040725 A1 | 3/2007 |

(Continued)

OTHER PUBLICATIONS

PCT International Search Report and Opinion Corresponding to PCT/US2019/044366 dated Apr. 20, 2020.

*Primary Examiner* — Moshe Wilensky
(74) *Attorney, Agent, or Firm* — Dority & Manning, P.A.

(57) ABSTRACT

A method is provided for servicing a jointed rotor blade of a wind turbine. The jointed rotor blade is positioned in a six o'clock position and a blade tip support element is secured to a tip section of the jointed rotor blade. A lift-support element is secured at a mounting location above the blade tip support element. A lifting line is coupled between the lift-support element and the blade tip support element. The tip section is separated from the root section of the jointed rotor blade such that the tip section is suspended above a support surface of the wind turbine via the blade tip support element and the lifting line. The tip section of the jointed rotor blade is serviced.

15 Claims, 10 Drawing Sheets

(56) References Cited

U.S. PATENT DOCUMENTS

| | | |
|---|---|---|
| 9,488,156 B2 | 11/2016 | Rose, Jr. et al. |
| 9,494,133 B2 | 11/2016 | Lohan et al. |
| 9,638,163 B2 | 5/2017 | Holloway et al. |
| 2009/0304507 A1 | 12/2009 | Dehlsen |
| 2010/0139062 A1 | 6/2010 | Reed et al. |
| 2010/0254813 A1 | 10/2010 | Dawson et al. |
| 2011/0020126 A1 | 1/2011 | Glenn et al. |
| 2012/0093627 A1 | 4/2012 | Christenson et al. |
| 2012/0328399 A1 | 12/2012 | Coloma Fernandez et al. |
| 2013/0236307 A1 | 9/2013 | Stege |
| 2014/0286780 A1 | 9/2014 | Lemos et al. |
| 2015/0232307 A1 | 8/2015 | Holloway et al. |
| 2015/0300175 A1 | 10/2015 | Pfeiffer et al. |
| 2016/0146183 A1 | 5/2016 | Puls |

FOREIGN PATENT DOCUMENTS

| | | |
|---|---|---|
| DE | 202012102170 U1 | 7/2012 |
| DE | 102011113482 B4 | 4/2013 |
| EP | 2252790 B1 | 9/2011 |
| EP | 2636890 A1 | 9/2013 |
| WO | WO2011095167 A2 | 8/2011 |
| WO | WO2013091655 A1 | 6/2013 |

SYSTEM AND METHOD FOR SERVICING A JOINTED ROTOR BLADE OF A WIND TURBINE

FIELD

The present disclosure relates in general to wind turbines, and more particularly to systems and methods for servicing segmented rotor blades of wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

In recent years, wind turbines for wind power generation have increased in size to achieve improvements in power generation efficiency and to increase the amount of power generation. Along with the increase in the amount of wind power generation, wind turbine rotor blades have also increased in size. With larger rotor blades, additional difficulties also occur, such as difficulties with manufacturing, transportation, and handling, just to name a few. As a result, larger rotor blades are often manufactured in segments.

One consequence of segmented rotor blades, however, is that the various joints will likely require periodic servicing. For example, in order to install, inspect, service, and/or replace the tip section of the rotor blade, the tip section must generally be removed from the rotor installed atop the tower of the wind turbine. This is typically accomplished through the use of a large ground crane, which can be complex, expensive, and time consuming.

Thus, the art is continuously seeking new and improved systems and methods that address the aforementioned issues. Accordingly, the present disclosure is directed to systems and methods for servicing segmented rotor blades of wind turbines

BRIEF DESCRIPTION

Aspects and advantages of the invention will be set forth in part in the following description, or may be obvious from the description, or may be learned through practice of the invention.

In one aspect, the present disclosure is directed to a method for servicing a jointed rotor blade of a wind turbine. The method may include positioning the jointed rotor blade in a six o'clock position. The method may also include securing a blade tip support element to a tip section of the jointed rotor blade. Additionally, the method may include securing at least one lift-support element at a mounting location above the blade tip support element. The method may include coupling a lifting line between the lift-support element(s) and the blade tip support element. Further the method may include separating the tip section of the jointed rotor blade from a root section of the rotor blade such that the tip section is suspended above a support surface of the wind turbine via the blade tip support element and the lifting line. The method may also include servicing the tip section of the jointed rotor blade.

In an embodiment, the blade tip support element may include at least one of a sling, a net, a mesh, a ring, or a sock. In an additional embodiment, coupling the blade tip support element to the tip section may also include encircling more than or equal to 5% of the span of the tip section and less than or equal to 90% of the span of the tip section.

In an embodiment, the blade tip support element may include a reinforced region of the tip section having integral lifting points and associated lifting straps. In such embodiments, the reinforced region may correspond to at least one of a bulkhead or one or more skins of the rotor blade.

In an embodiment, securing the lift-support element(s) at the mounting location above the blade tip support element may also include coupling the lift-support element(s) to at least one of a hub of the wind turbine, a rotor blade of the wind turbine, or the root section of the rotor blade. Additionally, in an embodiment, securing the lift-support element(s) at the mounting location above the blade tip support element may also include coupling a mounting ring to the jointed rotor blade at a spanwise location between a joint segment and the hub. In such embodiments, the mounting ring may have a cross-sectional profile corresponding to the cross-sectional profile of the jointed rotor blade at the spanwise location. Further, in an embodiment, securing the lift support element(s) at the mounting location above the blade support element may also include positioning a reinforcing bulkhead within a root section of the rotor blade. The lift support element may include at least one lifting point integrally formed with or coupled to the reinforcing bulkhead.

In an embodiment, separating the tip section of the jointed rotor blade from the root section of the rotor blade may also include accessing a joint between the tip section of the rotor blade and the root section and removing at least one securing member from an internal support structure coupling the tip section to the root section of the jointed rotor blade.

In an additional embodiment, servicing the tip section of the jointed rotor blade may also include installing a new tip section, inspecting the tip section, and/or repairing the tip section.

In an embodiment, the method may include lowering the tip section of the jointed rotor blade to the support surface.

In a further embodiment, the method may include coupling the lifting line(s) to a power source and applying a force to the lifting line(s) via the power source.

In another aspect, the present disclosure is directed to a method for installing a tip section of a jointed rotor blade to an installed root section of the jointed rotor blade. The method may include positioning the root section of the jointed rotor blade in a six o'clock position. The root section may have at least one lift support element, a reinforcing bulkhead disposed within the root section, and at least one lifting point integrally formed with or coupled to the reinforcing bulkhead. Thus, the method may also include securing a blade tip support element to the tip section of the rotor blade. The method may further include coupling a lifting line between the lift support element(s) and the blade tip support element. Additionally, the method may include lifting the tip section of the rotor blade toward the root section with the lifting line and coupling the tip section to the root section. It should be understood that the method may further include any of the additional steps and/or features described herein.

In another aspect, the present disclosure is directed to a system for servicing a jointed rotor blade of a wind turbine. The system may include a blade tip support element for securing to a tip section of the rotor blade. The system may also include at least one lift-support element for securing to a mounting location above the blade tip support element and a lifting line for coupling between the lift support element(s) and a blade tip support element. Thus, the tip section can be suspended above a support surface of the wind turbine via the blade tip support element and the lifting line. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for servicing a jointed rotor blade of a wind turbine. In particular, the present disclosure may include a system which supports a tip section of the jointed rotor blade and facilitates the lifting and lowering of the tip section relative to an installed root section of the jointed rotor blade. A method for servicing the jointed rotor blade may include positioning the installed root section in a six o'clock position and coupling a blade tip support element to the tip section. The method may also include mounting at least one lift-support element in a position above the blade tip support element, such as to the hub. A lifting line may be coupled between the lift-support element and the blade tip support element such that the tip section can be separated from the root section.

Figure 1:
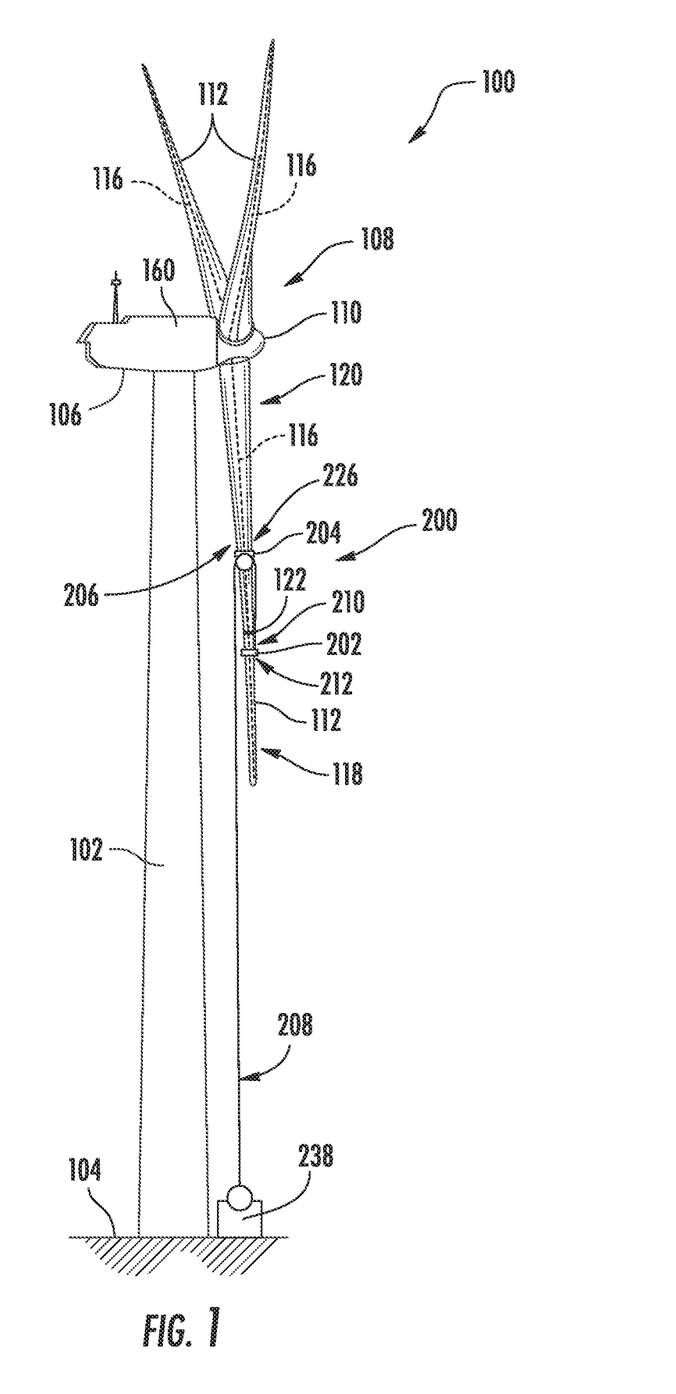
FIG. 1 illustrates a perspective view of one embodiment of a wind turbine according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 having a pitch axis 116 coupled to and extending outwardly from the hub 110. For example, in the illustrated embodiment, the rotor 108 includes three rotor blades 112. However, in an alternative embodiment, the rotor 108 may include more or less than three rotor blades 112. As shown, each rotor blade 112 may be a jointed rotor blade and may include a tip section 118 and a root section 120. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

Figure 2:
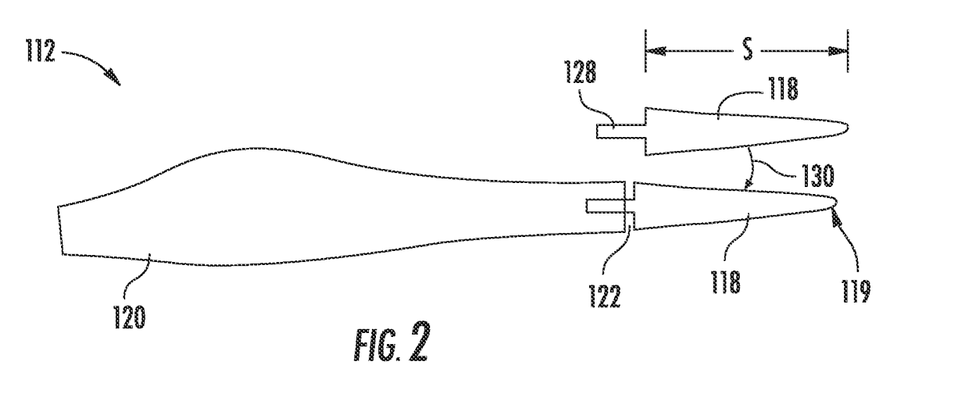
FIG. 2 illustrates a plan view of one embodiment of a rotor blade having a root section and a tip section according to the present disclosure.
Figure 3:
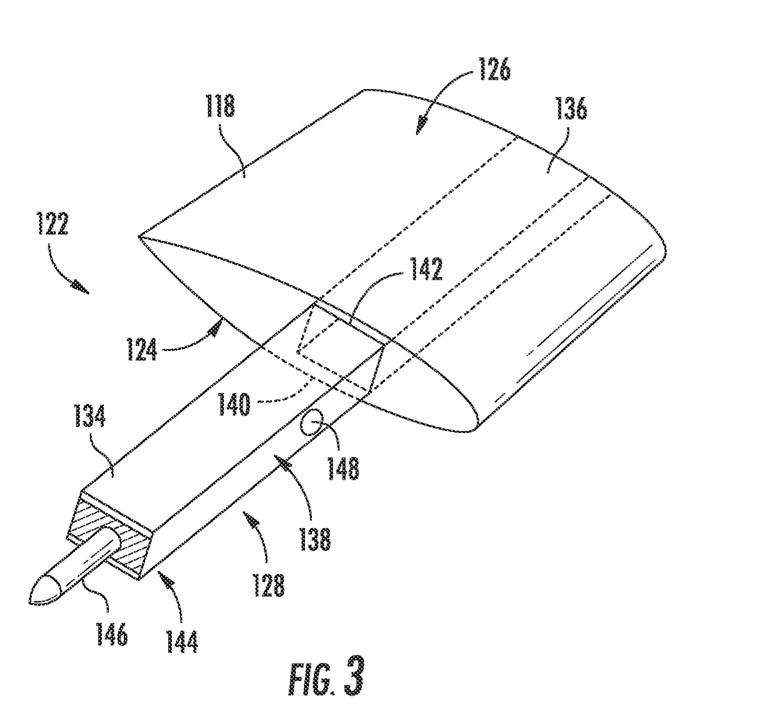
FIG. 3 illustrates a perspective view of one embodiment of a portion of the tip section according to the present disclosure.

Referring now to FIG. 2, a plan view of one of the jointed rotor blades 112 of FIG. 1 is illustrated. As shown, the jointed rotor blade(s) 112 may include, at least, a tip section 118 and a root section 120. Further, as shown, the tip section 118 and the root section 120 may each extend in opposite directions from a chordwise joint 122. The tip section 118 may have a tip span (S) which may be the distance between the distal end 119 of the tip section 118 and the chordwise joint 122. In addition, as shown, each of the blade sections 118, 120 may include a pressure side 124 (FIG. 3) and a suction side 126 (FIG. 3). The tip section 118 and the root section 120 are connected by an internal support structure 128 extending into both blade sections 118, 120 to facilitate joining of the blade sections 118, 120. The arrow 130 shows that the jointed rotor blade(s) 112 in the illustrated example includes two blade sections 118, 120 and that these blade sections 118, 120 are joined by inserting the internal support structure 128 into the root section 120. In addition, as shown, the root section 120 may include multiple spar structures 132 (FIG. 5) (also referred to herein as spar caps) that extend lengthwise for connecting with a blade root section 120 of the jointed rotor blade(s) 112 and with a beam structure 134 (FIG. 3) of the tip section 118.

Referring now to FIG. 3, a perspective view of a section of the tip section 118 according to the present disclosure is illustrated. As shown, the tip section 118 includes a beam structure 134 that forms a portion of the internal support structure 128 and extends lengthwise for structurally connecting with the root section 120. Further, as shown, the beam structure 134 forms a part of the tip section 118 having an extension protruding from a spar section 136, thereby forming an extending spar section. The beam structure 134 includes a shear web 138 connected with a suction side spar cap 140 and a pressure side spar cap 142.

Moreover, as shown, the tip section 118 may include one or more pin joints at an end 144 of the beam structure 134. In one embodiment, the pin joint(s) may include a pin that is in a tight interference fit with a bushing. More specifically, as shown, the pin joint(s) may include one pin tube 146 located on the beam structure 134. Thus, as shown, the pin tube 146 may be oriented in a spanwise direction. Further, the tip section 118 may also include a pin joint slot 148 located on the beam structure 134 at the chordwise joint 122. Moreover, as shown, the pin joint slot 148 may be oriented in a chordwise direction.

Figure 4:
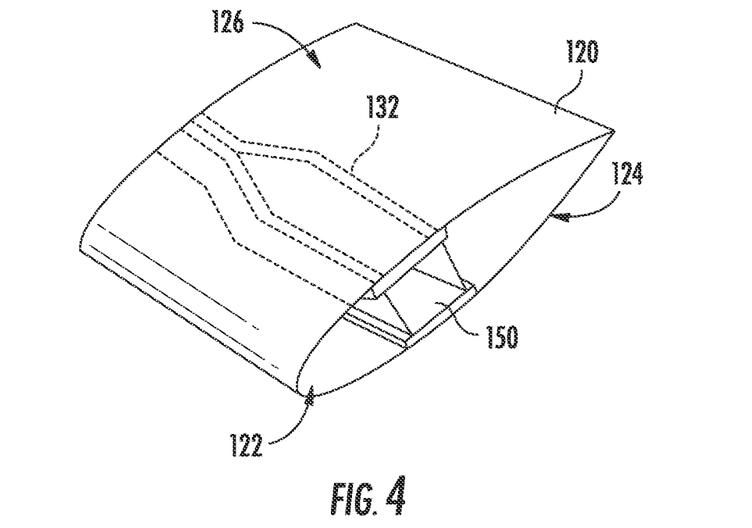
FIG. 4 illustrates a perspective view of one embodiment of a portion of the root section at a chordwise joint according to the present disclosure.

Referring now to FIG. 4, a perspective view of a section of the root section 120 at the chordwise joint 122 according to the present disclosure is illustrated. As shown, the root section 120 includes a receiving section 150 extending lengthwise within the root section 120 for receiving the beam structure 134 of the tip section 118. Further, as shown, the receiving section 150 may include the spar structures 132 that extend lengthwise for connecting with the beam structure 134 of the tip section 118.

Figure 5:
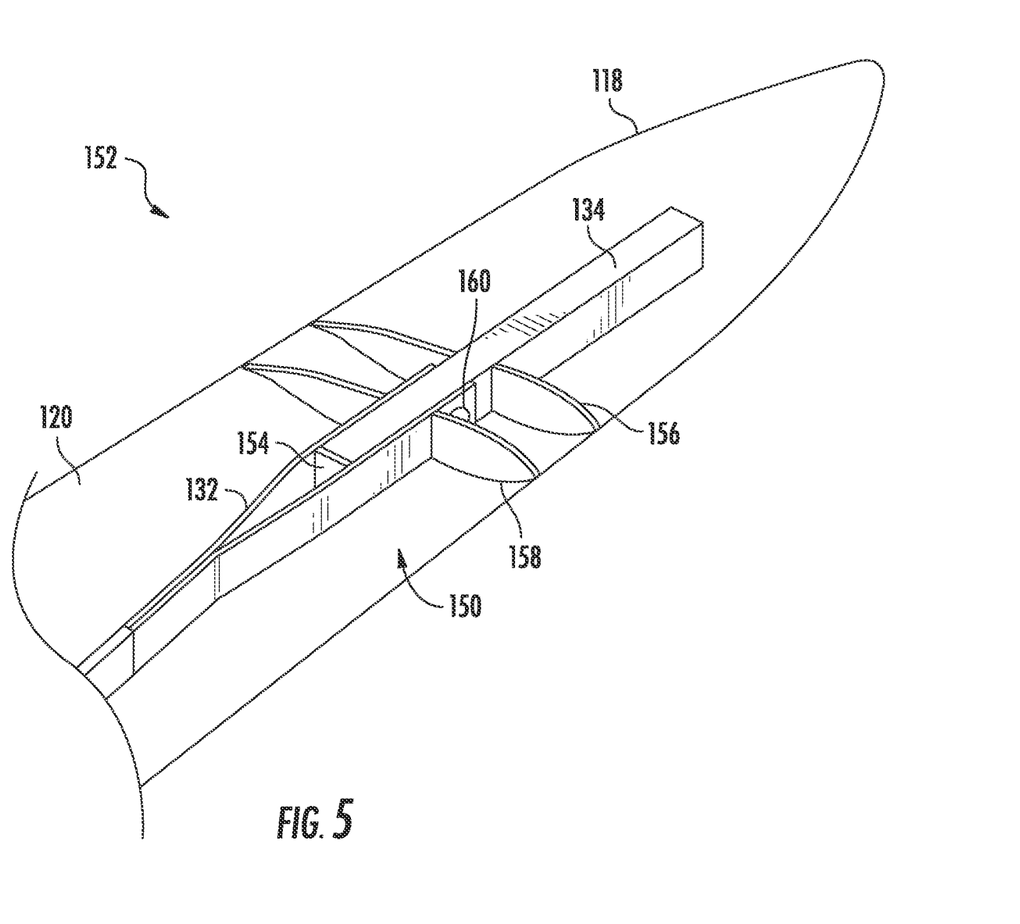
FIG. 5 illustrates an assembly of one embodiment of the jointed rotor blade of the wind turbine having the root section joined with the tip section according to the present disclosure.

Referring now to FIG. 5, an assembly 152 of the jointed rotor blade(s) 112 having the tip section 118 joined with the root section 120 according to the present disclosure is illustrated. As shown, the assembly 152 illustrates multiple supporting structures beneath outer shell members of the jointed rotor blade(s) 112 having the tip section 118 joined with the root section 120 and secured with at least one securing member 160. Further, as shown, the receiving section 150 includes the multiple spar structures 132 extending lengthwise that support the beam structure 134. The receiving section 150 also includes a rectangular fastening element 154 that connects with the pin tube 146 of the beam structure 134 in the spanwise direction. Further, the tip and root sections 118, 120 may also include chordwise members or 156, 158, respectively, at the chordwise joint 122. In another embodiment, each of the spar structures 132, the rectangular fastening element 154, and the chordwise members 156, 158 may be constructed of glass reinforced fibers.

Referring back to FIG. 1 and also to FIGS. 6-13, embodiments of a system 200 for servicing the jointed rotor blade(s) 112 of the wind turbine 100 described herein are depicted. As shown, the system 200 may include a blade tip support element 202 for securing to the tip section 118 of the jointed rotor blade(s) 112. The system 200 may also include at least one lift support element 204 for securing at a mounting location 206 above the blade tip support element 202. The system 200 may include one or more lifting lines 208 for coupling between the lift support element 204 and the blade tip support element 202. Thus, as generally shown, the tip section 118 may be suspended above the support surface 104 of the wind turbine 100 via the blade tip support element 202 and the lifting line 208.

In at least one embodiment, the system 200 may be utilized to service the jointed rotor blade(s) 112. In such an embodiment, the jointed rotor blade(s) 112 may be positioned in the six o'clock position and the system 200 may be installed on the wind turbine. The system 200 may then be used to service the tip section 118 of the jointed rotor blade(s) 112. For example, in one embodiment, with the system 200 installed on the wind turbine 100, the tip section 118 of the jointed rotor blade(s) 112 may be separated from the root section 120 by accessing the chordwise joint 122 and removing the securing member(s) 160. With the tip section 118 separated from the root section 120, the tip section 118 may be supported by the blade tip support element 202 and may be lowered via the lifting line(s) 208 to the support surface 104. In an alternative embodiment, the system 200 may be employed to install a new tip section 118 on an already installed root section 120. In such an embodiment, the tip section 118 may be positioned within and/or secured to the blade tip support element 202. The tip section 118, being supported by the blade tip support element 202 may be lifted toward the root section 120, which may be positioned in the six o'clock position, and coupled thereto. It should be appreciated that servicing the tip section 118 of the jointed rotor blade(s) 112 may include installing a new tip section 118, inspecting the tip section 118, and/or repairing the tip section 118.

Referring still to FIGS. 1 and 6-13, the blade tip support element 202 may include at least one of a sling, a net, a mesh, a web, a ring, or a sock. The blade tip support element 202 may, in an embodiment, encircle more than or equal to 5% of the tip span (S). The blade tip support element 202 may, in an embodiment, encircle less than or equal to 90% of the tip span (S). For example, the blade tip support element 202 may encircle less than or equal to 10% of the tip span (S). In an additional embodiment, the blade tip support element 202 may encapsulate more than or equal to 50% of the tip span (S). For example, the blade tip support element 202 may encapsulate more than or equal to 75% of the tip span (S). The blade tip support element 202 may also, in an embodiment, encircle less than or equal to 90% of the tip span (S).

In an embodiment, such as depicted in FIG. 1, the blade tip support element 202, may be configured as a sling or a ring, and may include a proximal ring 210. The proximal ring 210 may have a circumference which is less than a maximal circumference of the tip section 118. A body section 212 may be coupled along a circumferential edge to the proximal ring 210 and extend distally therefrom. The body section 212 may have a cross-sectional profile corresponding to a cross-sectional profile of the encircled portion of the tip section 118. In such embodiments, as shown, the blade tip support element 202 may encircle a portion of the tip section 118.

Figure 6:
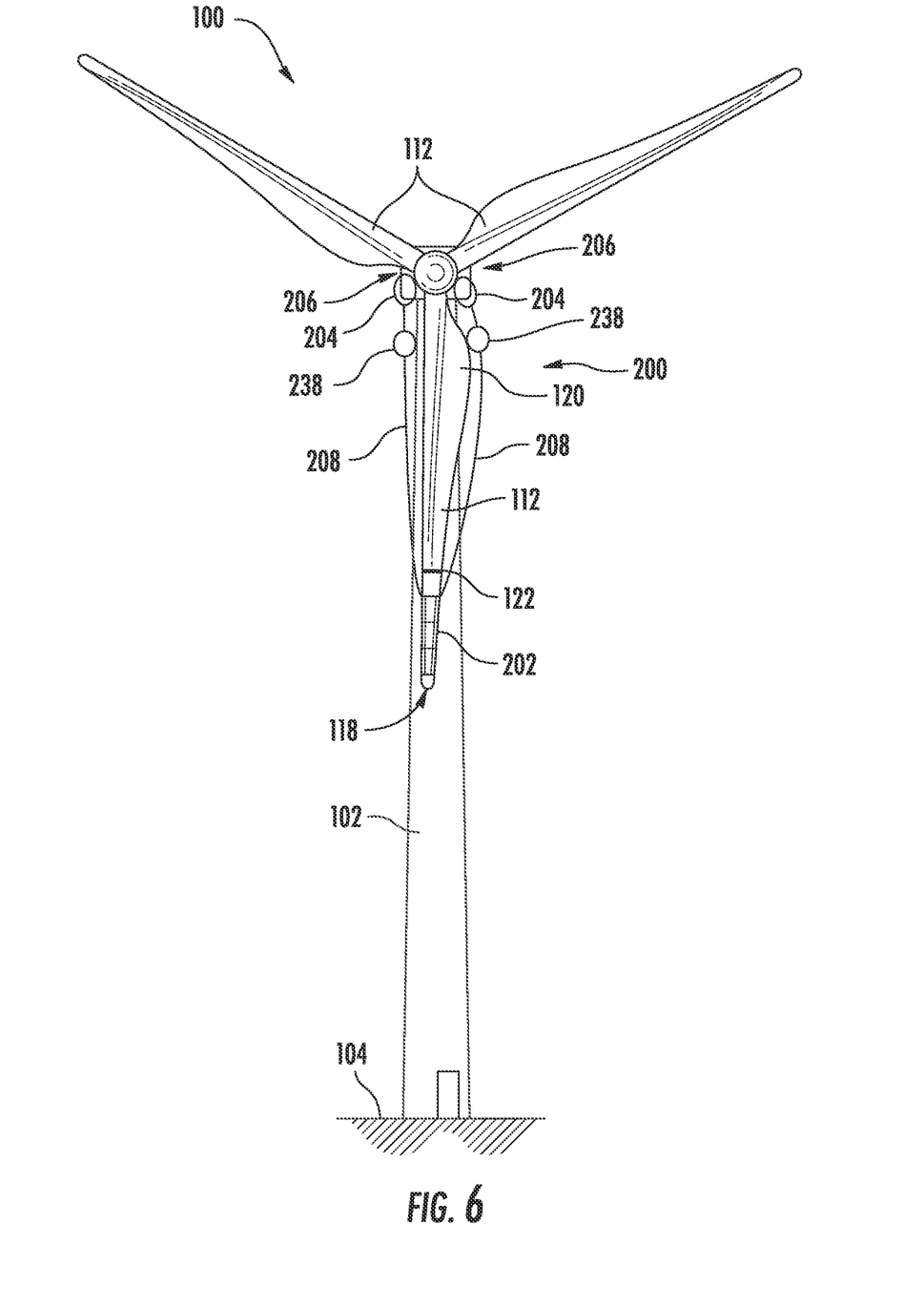
FIG. 6 illustrates a perspective view of one embodiment of a system for servicing a jointed rotor blade installed on the wind turbine according to the present disclosure.
Figure 9:
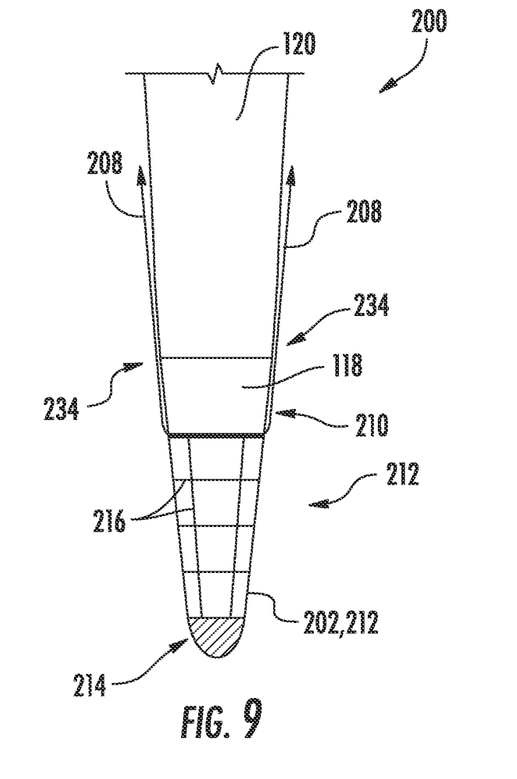
FIG. 9 illustrates a simplified view of a blade tip support element of the system for servicing a jointed rotor blade of FIG. 8 coupled to a tip section according to the present disclosure.
Figure 10:
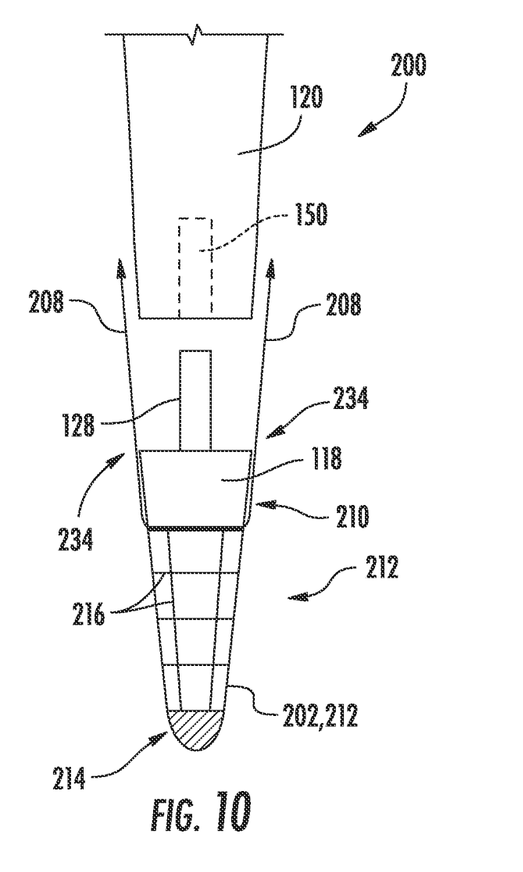
FIG. 10 illustrates a simplified view of a blade tip support element of the system of FIG. 8.

In several embodiments, such as depicted in FIGS. 6, 9, and 10, the blade tip support element 202 may be configured as a net, a mesh, a web, or a sock. In such an embodiment, the blade tip support element 202 may include the proximal ring 210, the body section 212, and a distal supporting section 214. The distal supporting section 214 may be coupled to the body section 212 opposite the proximal ring 210. The distal supporting section 214 may encapsulate a distal end 119 of the tip section 118.

In an embodiment, the blade tip support element 202 may include a plurality of web elements 216, such as depicted in FIGS. 9 and 10. The plurality of web elements 216 may be formed from nylon, polyester, polypropylene, cotton, and/or acrylic webbing or cordage. The web elements 216 may be interwoven and/or stitched together so as to form the blade tip support element 202.

In an alternative embodiment, the blade tip support element 202 may include a woven fabric. In still further embodiments, the blade tip support element 202 may include plastic and/or composite sheet. For example, the body section 212 and the distal supporting section 214 may, in at least one embodiment, be formed from plastic as a unitary body having an open proximal end and a closed distal end. It should be appreciated that various combinations of the embodiments discussed above may be combined to form the blade tip support element 202. For example, the blade tip support element 202 may have a portion formed from the webbing elements and another portion formed from the woven fabric.

In embodiments, such as depicted in FIGS. 8 and 11-13, the blade tip support element 202 may include a reinforced region 218 having at least one lifting point 220 and associated lifting straps 222. The lifting point(s) 220 may be integrally formed with the reinforced region 218 or may be coupled thereto. For example, the lifting point(s) 220 may be any suitable hardware attached in the reinforced area, such as hooks, rings, straps or brackets. In an embodiment wherein the lifting point(s) 220 is integrally formed with the reinforced region 218, the lifting point(s) 220 may include an opening through which a strap 222 or the lifting line 208 may be passed and secured.

Figure 11:
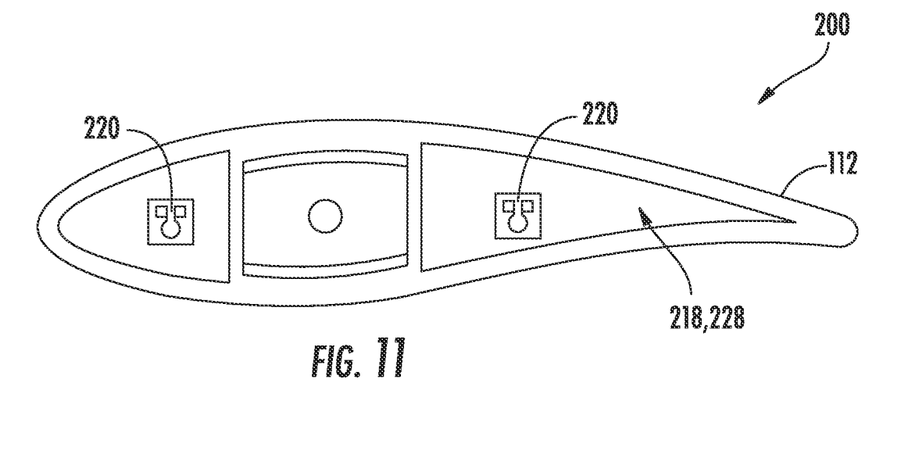
FIG. 11 illustrates a cross-sectional view of a rotor blade segment, particularly illustrating a reinforced region with lifting points of according to the present disclosure.
Figure 12:
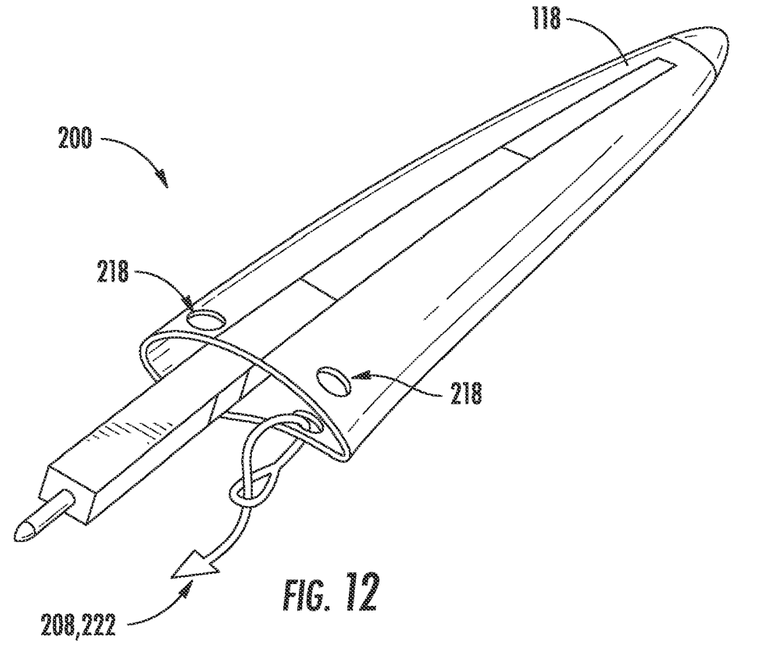
FIG. 12 illustrates a perspective view of the tip section, particularly illustrating the blade tip support element configured as reinforced regions of the skin of the rotor blade according to the present disclosure.
Figure 13:
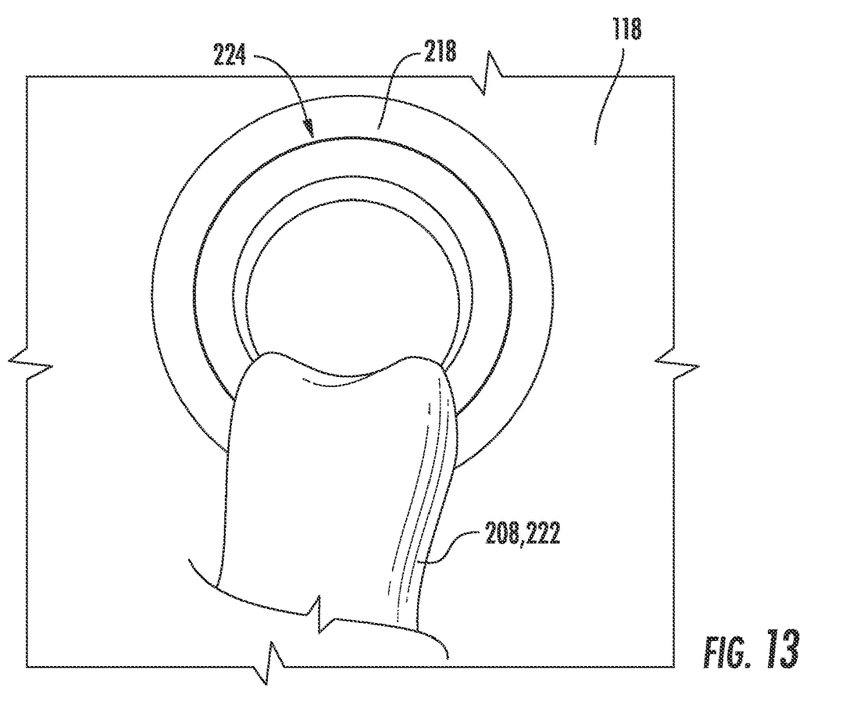
FIG. 13 illustrates a close-up view of one of the reinforced regions of FIG. 12.

In an embodiment, wherein the blade tip support element 202 is configured as the reinforced region 218, the reinforced region 218 may be a chordwise, reinforcing bulkhead 228, such as depicted in FIG. 11, disposed within the tip section 118 opposite a distal end 119 of the tip section 118. As depicted in FIGS. 12 and 13, in an alternative embodiment, the reinforced region 218 may correspond to one or more skins of the rotor blade 112. For example, in such an embodiment, the lifting point(s) 220 may be defined by an outer surface of the tip section 118 in a proximal portion of the tip section 118. The blade tip support element 202 may also include at least one reinforcing element 224 coupled to the tip section 118 adjacent the lifting point(s) 220.

Referring back to FIGS. 1 and 6-13, the mounting location 206 for the lift support element(s) 204 may be the hub 110, the nacelle 106, at least one rotor blade 112 of the wind turbine 100, the root section 120 of the jointed rotor blade(s) 112, or any other suitable mounting location in or around the wind turbine 100. In at least one embodiment, such as depicted in FIG. 1, at least one mounting ring 226 may be coupled to the jointed rotor blade 112 to be serviced at a spanwise location between the joint segment 122 and the hub 110. The mounting ring(s) 226 may have a cross-sectional profile corresponding to a cross-sectional profile of the jointed rotor blade 112 at the spanwise location. The mounting ring(s) 226 may include a tightening apparatus, such as a turnbuckle configured to secure the mounting ring(s) 226 around the jointed rotor blade 112. It should be appreciated that the lift support element(s) 204 may be a pulley block, a ring, a roller, a hoist, a fixed bar, or a reel.

In an additional embodiment, the mounting location 206 may be a reinforcing bulkhead 228 positioned within the root section 120 of the jointed rotor blade(s) 112. The lift support element(s) 204 may include the lifting point(s) 220.

Figure 7:
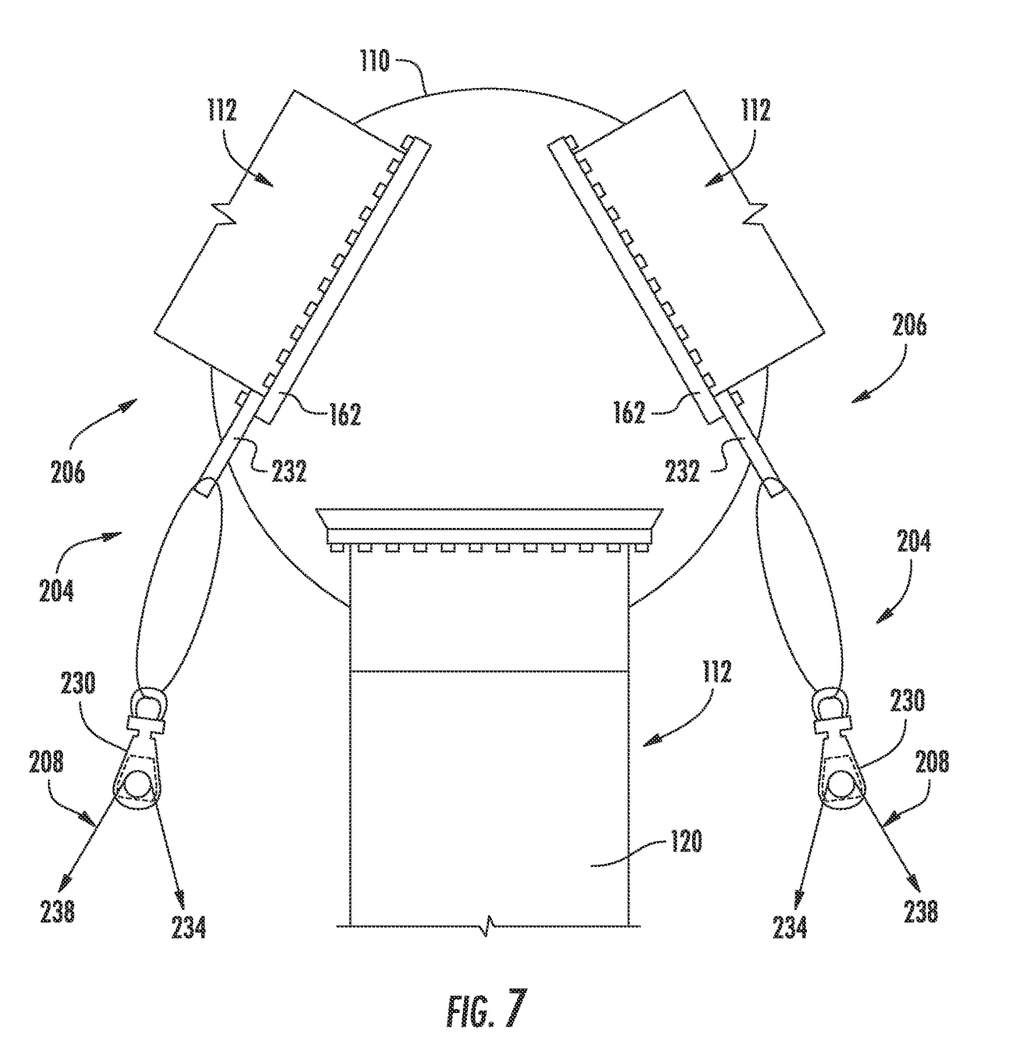
FIG. 7 illustrates a front view of a hub of the wind turbine, particularly illustrating a plurality of lift-support elements coupled to the hub according to the present disclosure.
Figure 8:
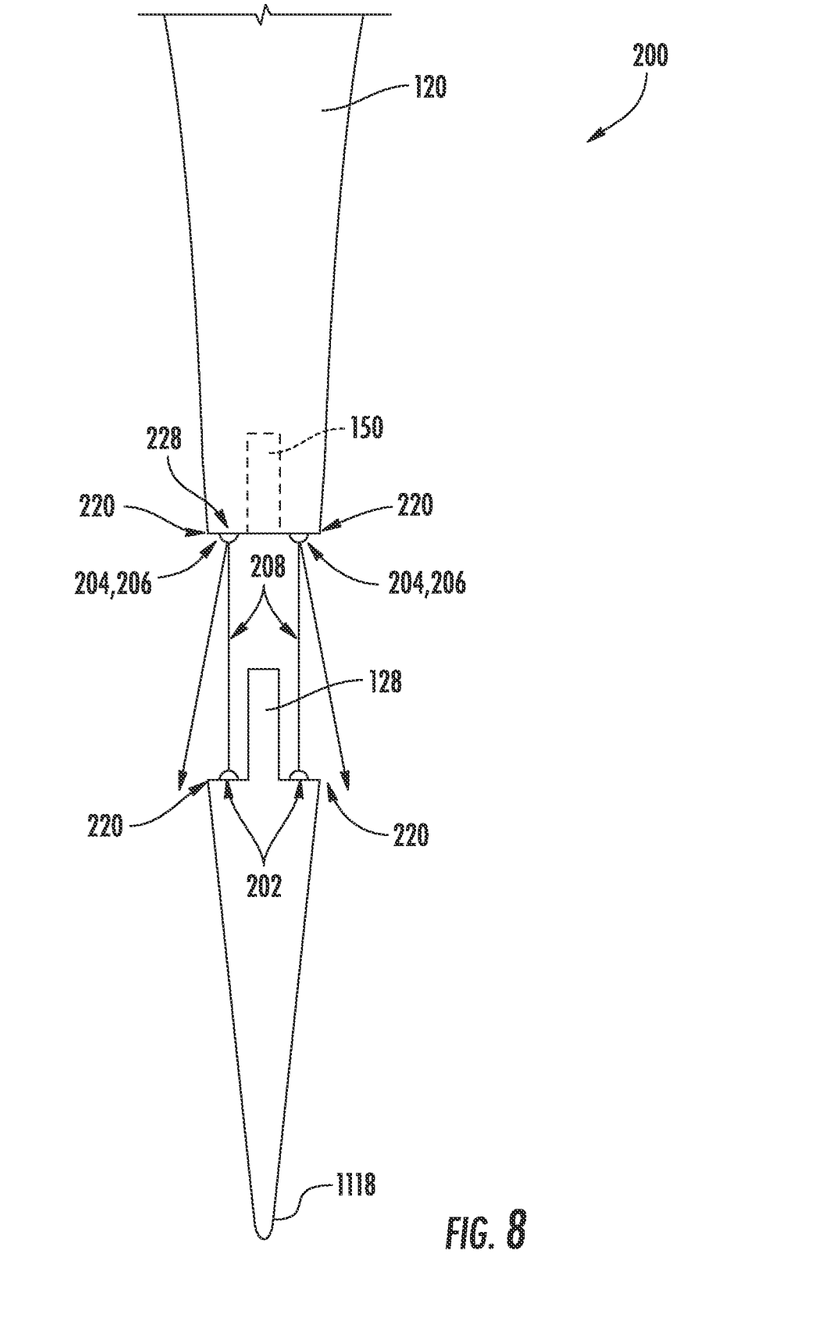
FIG. 8 illustrates a simplified view of one embodiment of a system for servicing a jointed rotor blade installed on the jointed rotor blade according to the present disclosure.

Referring to FIG. 7, in at least one embodiment, the mounting location 206 may be the hub 110. The lift support element(s) 204 may include at least one pulley block 230 coupled to a mounting block 232. The mounting block 232 may be secured to studs associated with a pitch bearing flange 162 for a rotor blade 112.

Referring again to FIGS. 1 and 6-13, in an embodiment, a lifting line 208 may be coupled between the lift support element(s) 204 and the blade tip support element 202. In at least one embodiment, the lifting line 208 may have a first end 234 coupled to the blade tip support element 202. The lifting line 208 may be operably coupled to the lift support element(s) 204. For example, in an embodiment such as depicted in FIG. 7, the lifting line 208 may pass through the pulley block 230. The lifting line 208 may have a second end 236 coupled to a power source 238. In at least one embodiment, the power source 238 may be located on the support surface 104. For example, the power source 238 may be a ground winch, a crane, a vehicle, or a plurality of technicians. In an alternative embodiment, the power source 238 may be a mechanical tensioning device, such as a hoist or a winch, positioned in-line between the blade tip support element 202 and the lift support element(s) 204.

Figure 14:
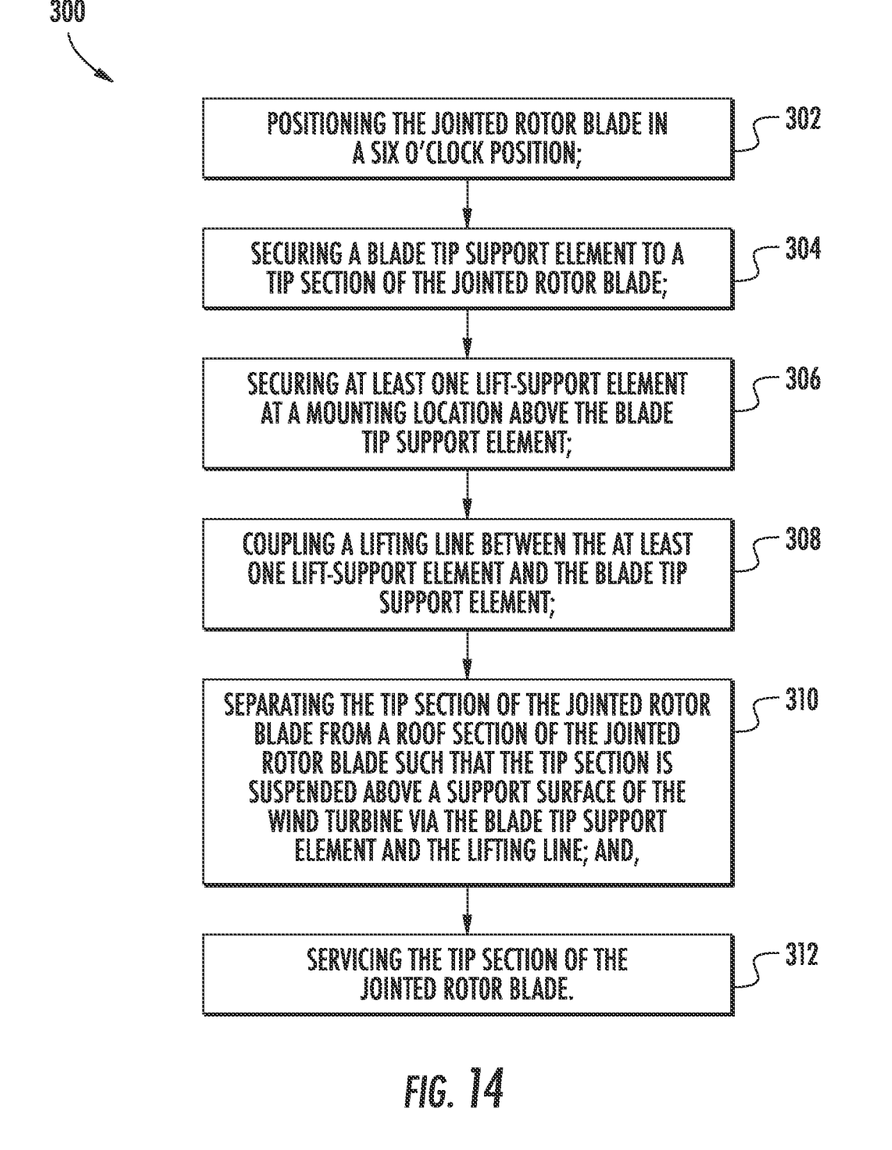
FIG. 14 illustrates a flow diagram of one embodiment of a method for servicing a jointed wind turbine rotor blade.

Referring now to FIG. 14, a flow diagram of one embodiment of a method 300 servicing a jointed wind turbine rotor blade is illustrated. The method 300 may be implemented using, for instance, the system 200 discussed above with references to FIGS. 1-13. FIG. 14 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include positioning the jointed rotor blade in a six o'clock position. As shown at (304), the method 300 may include securing a blade tip support element to a tip section of the jointed rotor blade. Additionally, as shown at (306), the method 300 may include securing at least one lift support element at a mounting location above the blade tip support element. As shown at (308), the method 300 may include coupling a lifting line between the lift support element(s) and the blade tip support element. As shown at (310), the method 300 may also include separating the tip section of the jointed rotor blade from a root section of the jointed rotor blade such that the tip section is suspended above a support surface of the wind turbine via the blade tip support element and the lifting line. Additionally, as shown at (312), the method 300 may also include servicing the tip section of the jointed rotor blade.

In additional embodiments, the method 300 may also, in accordance with the present disclosure, include coupling a lifting line to a power source and applying a force to the lifting line via the power source.

Figure 15:
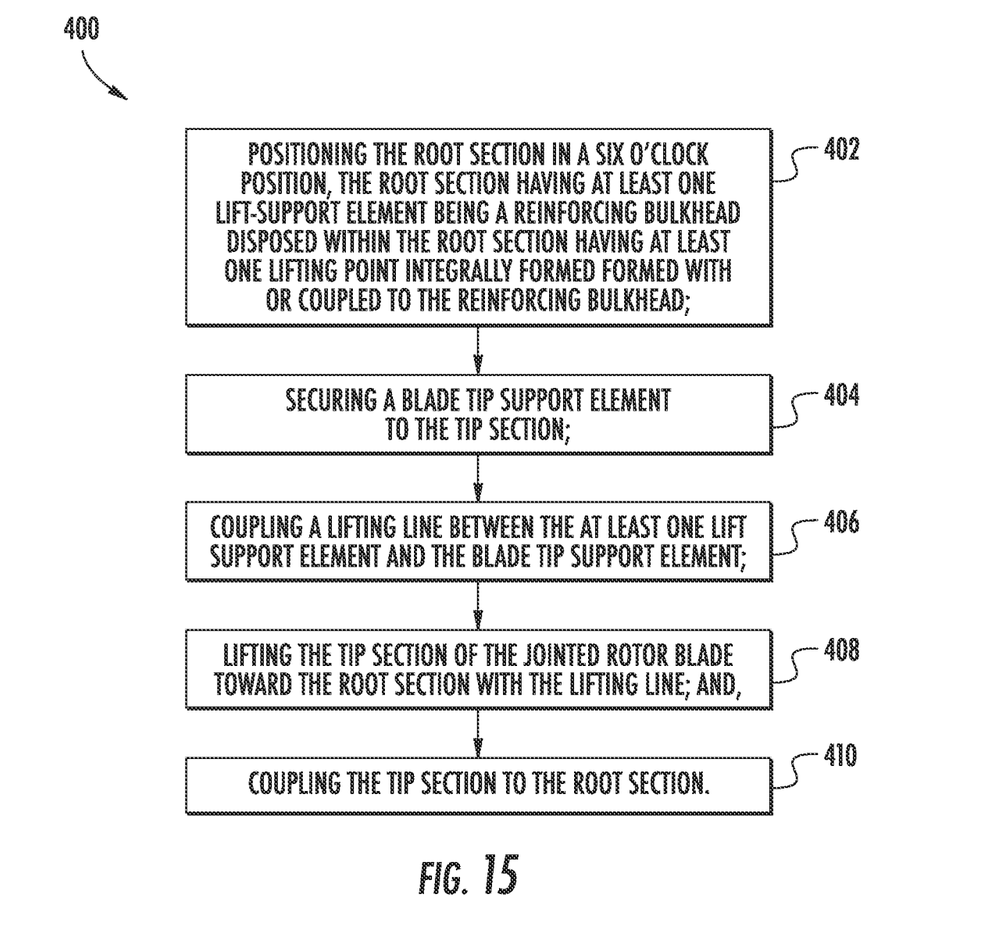
FIG. 15 illustrates a flow diagram of one embodiment of a method for installing a tip section of a jointed rotor blade to an installed root section of the jointed wind turbine blade according to the present disclosure.

Referring to FIG. 15, a flow diagram of one embodiment of a method 400 servicing a jointed wind turbine rotor blade is illustrated. The method 400 may be implemented using, for instance, the system 200 discussed above with references to FIGS. 1-13. FIG. 15 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include positioning the root section in a six o'clock position. The root section may have at least one lift-support element being a reinforcing bulkhead disposed within the root section having at least one lifting point integrally formed with or coupled to the reinforcing bulkhead. As shown at (404), the method 400 may include securing a blade tip support element to the tip section. As shown at (406), the method 400 may include coupling a lifting line between the at least one lift support element and the blade tip support elements. As shown at (408), the method 400 may include lifting the tip section of the rotor blade toward the root section with the lifting line. Additionally, as shown at (410), the method 400 may include coupling the tip section to the root section.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A method for servicing a jointed rotor blade of a wind turbine, the method comprising:
positioning the jointed rotor blade in a six o'clock position;
securing a blade tip support element to a tip section of the jointed rotor blade;
securing at least one lift-support element at a mounting location above the blade tip support element;
coupling a lifting line between the at least one lift-support element and the blade tip support element;
separating the tip section of the jointed rotor blade from a root section of the jointed rotor blade such that the tip section is suspended above a support surface of the wind turbine via the blade tip support element and the lifting line; and,
servicing the tip section of the jointed rotor blade.

Clause 2. The method as of clause 1, wherein the blade tip support element comprises at least one of a sling, a net, a mesh, a ring, or a sock.

Clause 3. The method of any preceding clause, wherein coupling the blade tip support element to the tip section further comprises encircling more than or equal to 5% of the span of the tip section and less than or equal to 90% of the span of the tip section.

Clause 4. The method of clause 1, wherein the blade tip support element comprises a reinforced region of the tip section having integral lifting points and associated lifting straps, the reinforced region corresponding to at least one of a bulkhead or one or more skins of the jointed rotor blade.

Clause 5. The method of any preceding clause, wherein securing the at least one lift-support element at the mounting location above the blade tip support element further comprises coupling the at least one lift-support element to at least one of a hub of the wind turbine, a nacelle of the wind turbine, an additional rotor blade of the wind turbine, or the root section of the jointed rotor blade.

Clause 6. The method of any preceding clause, wherein securing the at least one lift-support element at the mounting location above the blade tip support element further comprises:
coupling a mounting ring to the jointed rotor blade at a spanwise location between a joint segment and the hub, wherein the mounting ring has a cross-sectional profile corresponding to a cross-sectional profile of the jointed rotor blade at the spanwise location.

Clause 7. The method of any of clauses 1-5, wherein securing the at least one lift support element at the mounting location above the blade support element further comprises:
positioning a reinforcing bulkhead within the root section of the jointed rotor blade, wherein the lift-support element further comprises at least one lifting point integrally formed with or coupled to the reinforcing bulkhead.

Clause 8. The method of any preceding clause, wherein separating the tip section of the jointed rotor blade from the root section of the jointed rotor blade further comprises:
accessing a joint between the tip section of the jointed rotor blade and the root section; and,
removing at least one securing member from an internal support structure coupling the tip section to the root section of the jointed rotor blade.

Clause 9. The method of any preceding clause, wherein servicing the tip section of the jointed rotor blade further comprises at least one of installing a new tip section, inspecting the tip section, or repairing the tip section.

Clause 10. The method of any preceding clause, further comprising lowering the tip section of the jointed rotor blade to the support surface.

Clause 11. The method of any preceding clause, further comprising:
coupling the lifting line to a power source; and
applying a force to the lifting line via the power source.

Clause 12. A method for installing a tip section of a jointed rotor blade to an installed root section of the jointed wind turbine blade, the method comprising:
positioning the root section in a six o'clock position, the root section having at least one lift-support element being a reinforcing bulkhead disposed within the root section having at least one lifting point integrally formed with or coupled to the reinforcing bulkhead;

securing a blade tip support element to the tip section;
coupling a lifting line between the at least one lift support element and the blade tip support element;
lifting the tip section of the jointed rotor blade toward the root section with the lifting line; and,
coupling the tip section to the root section.

Clause 13. The method of clause 12, wherein securing the blade tip support element to the tip section further comprises:
positioning at least a portion of the tip section within at least one of a sling, a net, a mesh, a ring, or a sock.

Clause 14. The method of clause 12 or 13, wherein securing the blade tip support element to the tip section further comprises encircling more than or equal to 50% of the span of the tip section and less than or equal to 90% of the span of the tip section.

Clause 15. The method of clause 12, wherein the blade tip support element comprises a reinforced region of the tip section having lifting points and associated lifting straps, the reinforced region corresponding to at least one of a bulkhead or one or more skins of the jointed rotor blade.

Clause 16. A system for servicing a jointed rotor blade of a wind turbine, the system comprising:
a blade tip support element for securing to a tip section of the jointed rotor blade;
at least one lift-support element for securing at a mounting location above the blade tip support element; and,
a lifting line for coupling between the at least one lift-support element and the blade tip support element,
wherein the tip section is suspended above a support surface of the wind turbine via the blade tip support element and the lifting line.

Clause 17. The system of clause 16, wherein the blade tip support element comprises at least one of a sling, a net, a mesh, a ring, or a sock.

Clause 18. The system of clause 16, wherein the blade tip support element comprises a reinforced region of the tip section having at least one lifting point integrally formed therewith or coupled thereto and associated lifting straps, the reinforced region corresponding to at least one of a bulkhead or one or more skins of the jointed rotor blade.

Clause 19. The system of any of clauses 16-18, wherein the at least one lift-support element is coupled to at least one of a hub of the wind turbine, a nacelle of the wind turbine, a jointed rotor blade of the wind turbine, or a root section of the jointed rotor blade.

Clause 20. The system of any of clauses 16-19, further comprising:
at least one power source coupled to the lifting line.

What is claimed is:

1. A method for servicing a jointed rotor blade of a wind turbine, the method comprising:
positioning the jointed rotor blade in a six o'clock position;
securing a blade tip support element to a tip section of the jointed rotor blade;
securing at least one lift-support element at a mounting location above the blade tip support element;
coupling a lifting line between the at least one lift-support element and the blade tip support element;
separating the tip section of the jointed rotor blade from a root section of the jointed rotor blade such that the tip section is suspended above a support surface of the wind turbine via the blade tip support element and the lifting line;
servicing the tip section of the jointed rotor blade; and
wherein the blade tip support element is located at a spanwise location between a distal and a proximal end of the tip section and encircles the tip section at the spanwise location.

2. The method of claim 1, wherein the blade tip support element comprises at least one of a sling, a net, a mesh, a ring, or a sock.

3. The method of claim 2, wherein coupling the blade tip support element to the tip section further comprises encircling more than or equal to 5% of a span of the tip section and less than or equal to 90% of the span of the tip section.

4. The method of claim 1, wherein securing the at least one lift-support element at the mounting location above the blade tip support element further comprises coupling the at least one lift-support element to at least one of a hub of the wind turbine, a nacelle of the wind turbine, an additional rotor blade of the wind turbine, or the root section of the jointed rotor blade.

5. The method of claim 1, wherein securing the at least one lift-support element at the mounting location above the blade tip support element further comprises:
coupling a mounting ring to the jointed rotor blade at a spanwise location between a joint segment and the hub, wherein the mounting ring has a cross-sectional profile corresponding to a cross-sectional profile of the jointed rotor blade at the spanwise location.

6. The method of claim 1, wherein securing the at least one lift support element at the mounting location above the blade support element further comprises:
positioning a reinforcing bulkhead within the root section of the jointed rotor blade, wherein the lift-support element further comprises at least one lifting point integrally formed with or coupled to the reinforcing bulkhead.

7. The method of claim 1, wherein separating the tip section of the jointed rotor blade from the root section of the jointed rotor blade further comprises:
accessing a joint between the tip section of the jointed rotor blade and the root section; and,
removing at least one securing member from an internal support structure coupling the tip section to the root section of the jointed rotor blade.

8. The method of claim 1, wherein servicing the tip section of the jointed rotor blade further comprises at least one of installing a new tip section, inspecting the tip section, or repairing the tip section.

9. The method of claim 1, further comprising lowering the tip section of the jointed rotor blade to the support surface.

10. The method of claim 1, further comprising:
coupling the lifting line to a power source; and,
applying a force to the lifting line via the power source.

11. A method for installing a tip section of a jointed rotor blade to an installed root section of the jointed wind turbine blade, the method comprising:
positioning the root section in a six o'clock position, the root section having at least one lift-support element being a reinforcing bulkhead disposed within the root section having at least one lifting point integrally formed with or coupled to the reinforcing bulkhead;
securing a blade tip support element to the tip section;
coupling a lifting line between the at least one lift support element and the blade tip support element;
lifting the tip section of the jointed rotor blade toward the root section with the lifting line;
coupling the tip section to the root section; and wherein the blade tip support element is located at a spanwise location between a distal and a proximal end of the tip section and encircles the tip section at the spanwise location.

12. The method of claim 11, wherein securing the blade tip support element to the tip section further comprises:
positioning at least a portion of the tip section within at least one of a sling, a net, a mesh, a ring, or a sock.

13. The method of claim 12, wherein securing the blade tip support element to the tip section further comprises encircling more than or equal to 50% of a span of the tip section and less than or equal to 90% of the span of the tip section.

14. A method for servicing a jointed rotor blade of a wind turbine, the method comprising:
positioning the jointed rotor blade in a six o'clock position;
securing a blade tip support element to a tip section of the jointed rotor blade;
securing at least one lift-support element at a mounting location above the blade tip support element;
coupling a lifting line between the at least one lift-support element and the blade tip support element;
separating the tip section of the jointed rotor blade from a root section of the jointed rotor blade such that the tip section is suspended above a support surface of the wind turbine via the blade tip support element and the lifting line;
servicing the tip section of the jointed rotor blade; and
wherein securing the at least one lift-support element at the mounting location above the blade tip support element further comprises coupling a mounting ring to the jointed rotor blade at a spanwise location between a joint segment and the hub, wherein the mounting ring has a cross-sectional profile corresponding to a cross-sectional profile of the jointed rotor blade at the spanwise location.

15. A method for servicing a jointed rotor blade of a wind turbine, the method comprising:
positioning the jointed rotor blade in a six o'clock position;
securing a blade tip support element to a tip section of the jointed rotor blade;
securing at least one lift-support element at a mounting location above the blade tip support element;
coupling a lifting line between the at least one lift-support element and the blade tip support element;
separating the tip section of the jointed rotor blade from a root section of the jointed rotor blade such that the tip section is suspended above a support surface of the wind turbine via the blade tip support element and the lifting line;
servicing the tip section of the jointed rotor blade; and
wherein the blade tip support element comprises a reinforced region of the tip section having integral lifting points and associated lifting straps, the reinforced region corresponding to a bulkhead located within the tip section.

* * * * *